United States Patent [19]

Skopelja et al.

[11] Patent Number: 5,064,986
[45] Date of Patent: Nov. 12, 1991

[54] CORDLESS EXOTHERMIC ROD IGNITION SYSTEM

[75] Inventors: Charles Skopelja, Lancaster; Francis A. Vendetta, Pickerington, both of Ohio

[73] Assignee: Arcair Company, Wichita, Kans.

[21] Appl. No.: 421,554

[22] Filed: Oct. 13, 1989

[51] Int. Cl.$^5$ .................................................. B23K 9/26
[52] U.S. Cl. ...................................................... 219/70
[58] Field of Search .............. 219/68, 69.1, 70, 76.16, 219/121.53, 121.57, 130.1, 158, 161, 69.11, 69.13; 266/48

[56] References Cited

U.S. PATENT DOCUMENTS

| | | | |
|---|---|---|---|
| D. 293,296 | 10/1987 | Chaney | D8/30 |
| 488,468 | 12/1892 | Burton et al. | 219/130.1 |
| 4,791,268 | 12/1988 | Sanders et al. | 219/121.57 |
| 4,801,780 | 1/1989 | Hayes | 219/130.1 |
| 4,864,093 | 9/1989 | Henderson et al. | 219/70 |

*Primary Examiner*—A. D. Pellinen
*Assistant Examiner*—Geoffrey S. Evans
*Attorney, Agent, or Firm*—Herzog, Crebs & McGhee

[57] ABSTRACT

A cordless hand held exothermic rod ignition system including a housing containing a direct current power source to permit contact by an exothermic rod to initiate an arc between one end of the exothermic rod and the ignition system to cause ignition of that end of the exothermic rod in the presence of oxygen supplied through the exothermic rod.

8 Claims, 1 Drawing Sheet

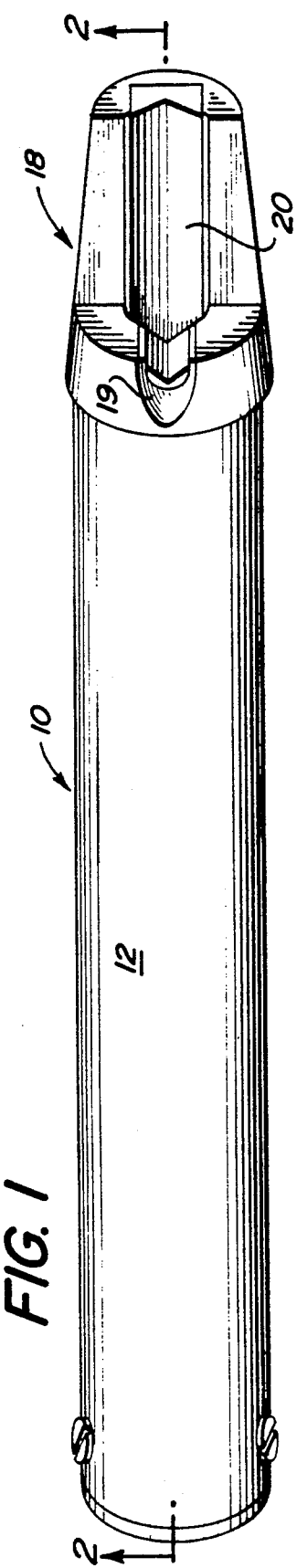
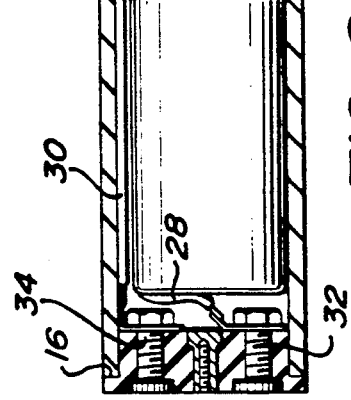
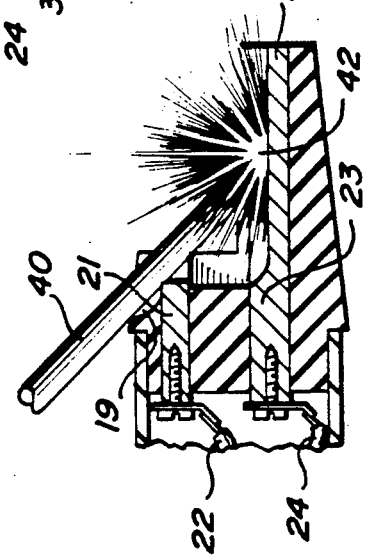
FIG. 1
FIG. 2
FIG. 3

CORDLESS EXOTHERMIC ROD IGNITION SYSTEM

TECHNICAL FIELD

This invention pertains to exothermic cutting wherein an elongated mass of metal in the form of an electrode, burning bar or rod having a central passage or passages is ignited in the presence of an oxidizing gas (e.g. oxygen) to form a flame or products of combustion which can be directed at a structural shape for cutting or piercing of the structural shape. In particular the invention pertains to a self-contained system for producing an arc at one end of the electrode, burning bar or rod to cause ignition of the electrode, bar or rod.

BACKGROUND OF THE INVENTION

Conventional exothermic burning bars, electrodes or rods to which the present invention pertains are described in U.S. Pat. Nos. 4,391,209; 4,437,649; and 4,864,093 assigned to the assignee of the present invention. The exothermic rods of the aforementioned patents, the specifications of which are incorporated herein by reference, are ideally suited for use in the "Self-Contained Exothermic Cutting System" described in U.S. Pat. No. 4,573,665 the specification of the latter patent also incorporated herein by reference. In the apparatus of the '665 patent the exothermic rod is held by a torch of the type disclosed in U.S. Pat. No. Des. 293,296 assigned to the assignee of the present invention, the torch adapted to hold the exothermic rod, conduct oxygen to the projecting end of the exothermic rod and connect said electrode via a cable to one terminal of a battery. The system of the '665 patent also includes a striker of the type disclosed and claimed in U.S. Pat. No. Des. 292,262 also assigned to the assignee of the present invention. The striker is adapted to be connected to the other terminal of the battery so that when the exothermic rod held by the torch is caused to contact a conductor on the striker momentarily and withdrawn an arc initiates between the electrode and the striker to in turn cause ignition of the exothermic rod which then can be used to cut a workpiece.

One problem with the system of the '665 patent is the need for the battery and cable to initiate burning of the exothermic rod.

BRIEF SUMMARY OF THE INVENTION

The present invention pertains to a cordless exothermic rod ignition system for use with a torch for holding exothermic cutting rods. The system consists of a housing adapted to contain a power source and first and second means fixed to the housing connected respectively to positive and negative terminals of the power source (supply) to permit the exothermic cutting rod to complete a circuit between the first and second means to facilitate striking of an arc between the negatively charged means and the electrode.

BRIEF DESCRIPTION OF THE DRAWING

FIG. 1 is a top plan view of the cordless exothermic rod ignition system according to the invention.

FIG. 2 is a section taken along line 2—2 of FIG. 1.

FIG. 3 is a fragmentary longitudinal sectional view of the first, right or front end of the device of FIG. 1 showing the device in use.

DETAILED DESCRIPTION OF THE INVENTION

After the system shown and described in U.S. Pat. No. 4,573,665 was invented and put into use the inventors recognized the need to simplify the system to make it even more portable and usable in very confined places. The system of the '665 patent contains the exothermic torch which is held by the user/operator to position the exothermic rod for cutting and could not be materially changed but improved by eliminating the electrical cable. Elimination of both electrical cables and the heavy battery would also improve operator comfort and safety if a smaller ignition system could be achieved. With the problem of the prior art system recognized the cordless exothermic rod ignition system shown generally as 10 in FIGS. 1 and 2 of the drawing was invented. System 10 includes a housing 12 having the general shape of an elongated cylinder or tube and is fabricated from an insulating material such as a thermoplastic resin. Housing 12 includes a first end 14 and a second end 16.

Mounting on first end 14 of housing 12 is an electrically insulated head or electrode support 18. Head 18 includes means to support a first electrical conductor means 19 and second conductor means 20. Conductor means 19 and 20 are spaced from one another by suitable electrically insulating portion of the head 18 and in turn are connected via adaptors 21, 23, and electrical conduits 22 and 24 respectively to the positive and negative terminals of a power supply 26 disposed within housing 12. Power supply 26 can be a series of disposable dry batteries or a rechargeable battery pack adapted to produce a four to six volt output with adequate amperage. The rechargeable battery pack 26 can be recharged by a suitable device by providing conduits 28, 30 connected between the conduits 22, 24 respectively and electrical contacts 32, 34 which are contained in a cap or closure 36 fitted to the second end 16 of housing 12. Contacts 32, 34 are fabricated to in turn contact the recharging device (not shown) to recharge the battery pack 26 as is well known in the art.

As shown in FIG. 3 when the system 10 is constructed as described above, the battery pack 26 fully charged and an exothermic cutting rod 40 such as shown in U.S. Pat. Nos. 4,391,209; 4,437,649; or 4,864,093 is placed in the exothermic torch and oxygen is caused to be conducted to the central passage of the rod 40 and the rod 40 is placed in contact with conductor 18 and while in contact with conductor 18 is moved toward conductor 20 so that the rod 40 by momentary contact with conductor 20 causes an arc 42 to be struck between conductor 20 and rod 40. The arc will cause the rod 40 to burn so the user can direct the burning rod to cut or pierce a workpiece as is well known in the art. Once burning has been initiated the ignition system or device 10 can be set aside by the user/operator of the torch until the rod is consumed and ignition of another rod must take place.

The system or device of the present invention eliminates the need for the user/operator to have a large battery and electrical cables and can in fact be carried by the user/operator in a pocket or pouch for ready use.

Having thus described our invention what is desired to be secured by Letters Patent of the United States is set forth in the appended claims.

We claim:

1. A cordless exothermic rod ignition system comprising in combination:
   an electrically insulated generally cylindrical housing having a first end and a second end;
   first means fixed to said first end of said housig and adapted to be connected to the positive terminal of a source of direct current;
   second means fixed to said first end of said housing and adapted to be connected to the negative terminal of a source of direct current;
   a source of direct current disposed within said housing and connected to said first and second means on said first end of said housing;
   said first and second means fixed to said first end of said housing being spaced apart from one another and adapted to permit simultaneous contact by an elongated metallic exothermic electrode and subsequent repositioning of said electrode while maintaining contact with at least one of said means to permit an arc to strike between said electrode and one of said means in the presence of oxygen to cause ignition and burning of said electrode.

2. An ignition system according to claim 1 wherein said first and second means are respectively copper or copper based alloy striker plates.

3. An ignition system according to claim 1 wherein said source of direct current disposed within said housing is a disposable battery pack.

4. An ignition system according to claim 3 wherein said battery pack produces at least four volts.

5. An ignition system according to claim 1 wherein said source of direct current is a rechargeable battery pack.

6. An ignition system according to claim 1 wherein said housing has disposed therein a rechargeable battery pack and said housing includes a cap on said second end with means to permit recharging of said battery pack.

7. An ignition system according to claim 1 wherein said first and second means are constructed and arranged to facilitate contact by said electrode with minimun exposure of said first and second means to the user.

8. An ignition system according to claim 1 wherein said system is constructed and arranged to be hand held and facilitates ignition of an exothermic electrode.

* * * * *